Jan. 30, 1968   R. A. FITCH   3,366,799
ELECTRICAL PULSE GENERATORS
Filed Oct. 1, 1964

3,366,799
ELECTRICAL PULSE GENERATORS
Richard Anthony Fitch, Mortimer, England, assignor to United Kingdom Atomic Energy Authority, London, England
Filed Oct. 1, 1964, Ser. No. 400,725
Claims priority, application Great Britain, Oct. 10, 1963, 39,994/63
3 Claims. (Cl. 307—110)

ABSTRACT OF THE DISCLOSURE

A circuit for generating high-voltage pulses which comprises a plurality of series-connected capacitors, connections for charging the capacitors in parallel so that consecutive capacitors of the series are charged with oppositely polarized voltages, and having inductor means connected in series with switch means across only each alternate capacitor such that upon simultaneous closing of the switch means, the voltage on the alternate capacitors reverses to produce an output voltage pulse across the series-connected capacitors.

---

This invention relates to pulse generating circuits, and more especially to circuits for generating high-voltage pulses.

In the well known Marx generator, a plurality of capacitors, say $n$ in number, is charged in parallel to a voltage V, and high-speed switches (normally spark-gaps) are connected between consecutive capacitors in such a way as to connect the capacitors in series when the switches close simultaneously. The resulting output voltage from the series-connected capacitors is approximately $nV$. A disadvantage of the Marx generator, is that the necessary inclusion of a switch between each pair of capacitors means that the output impedance tends to be high, so that the rate of rise of current in an external load can be limited by the impedance of the switches in series.

According to the present invention a pulse generating circuit comprises a plurality of series-connected capacitors, connections for charging the capacitors in parallel so that consecutive capacitors of the series are charged to alternate polarities, and inductor means connected in series with switch means across each alternate capacitor, whereby on said switch means being closed substantially simultaneously, the voltage on said alternate capacitors reverses to produce an output voltage pulse across the series-connected capacitors.

To enable the nature of the present invention to be more readily understood, attention is directed, by way of example, to the accompanying drawing wherein.

Figure 1:
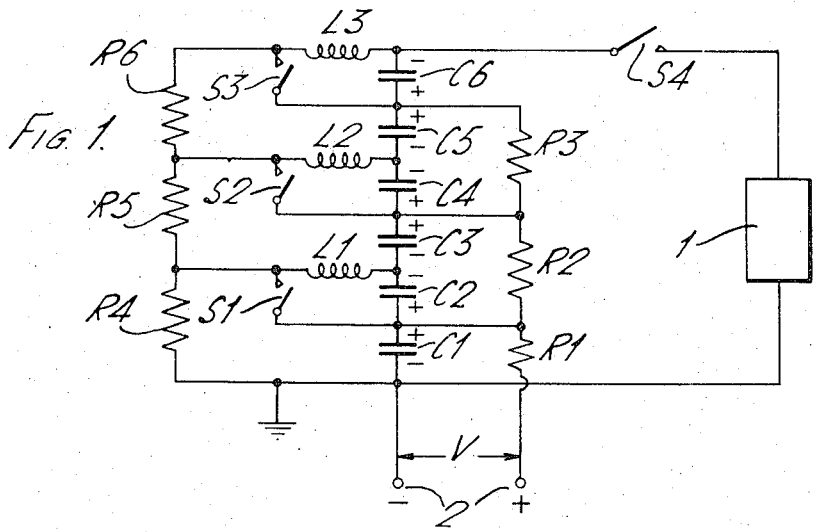
FIGURE 1 is a circuit diagram of a pulse generating circuit embodying the present invention.

FIGURE 1 shows six capacitors C1–C6 connected in series, output connections being taken from across the series-connected capacitors, via a switch S4, to a load 1. Across alternate capacitors C2, C4 and C6 are connected inductors L1, L2 and L3 in series with switches S1, S2 and S3 respectively. Connections 2 are provided for charging each of the capacitors C1–C6, through resistors R1–R6 to a voltage V, in such a way that consecutive capacitors are charged to alternate polarities as shown. The net voltage across the series-connected capacitors is therefore zero. S1–S4 are normally spark-gaps.

Assuming S4 to be open, on simultaneous closure of switches S1–S3, C2 resonates with L1, C4 with L2 and C6 with L3. The resonant frequencies of these three resonant circuits are the same, so that after half a cycle the voltages on C2, C4 and C6 have simultaneously reversed to give an output voltage of 6 v. At this instant the high-speed switch S4 is closed to connect the circuit to the load. It will be seen that the output impedance does not include the switches S1–S3; moreover as compared with the Marx generator the number of switches is halved.

Figure 2:
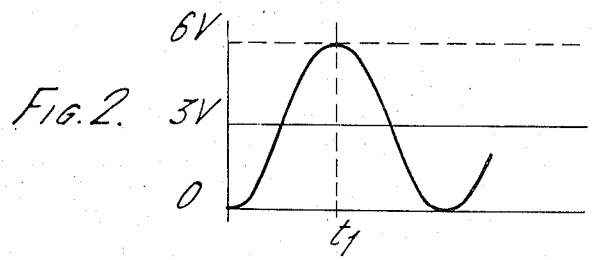
FIGURE 2 shows the output waveform of the circuit of FIGURE 1.

FIGURE 2 shows the output waveform, which is approximately of the form $V_{\text{OUT}} = 3V(1 - \cos wt.)$, where $w^2 = 1/LC$, L and C being the individual inductances and capacitances of L1, L2, L3 and C2, C4, C6 respectively. $t_1$ marks the instant at which S4 is closed.

More exactly, neglecting the load, $$V_{\text{OUT}}(t) = mV(1 - e^{-\alpha t} \cos wt.)$$

where $\alpha = R/2L$, R being the effective series resistance of each resonant circuit, and $m$ = the number of pairs of series-connected capacitors. The peak voltage is $$V_{\text{PEAK}} = mV\left(1 + e^{\frac{-\pi R}{R_0}}\right)$$

where $R_0 = 2(L/C)^{\frac{1}{2}}$

For times short compared with $(LC)^{\frac{1}{2}}$ the output impedance is capacitative and is $$Z = C/2m$$

In some applications, for which a relatively slowly rising pulse is suitable, the switch S4 can be omitted.

Figure 3:
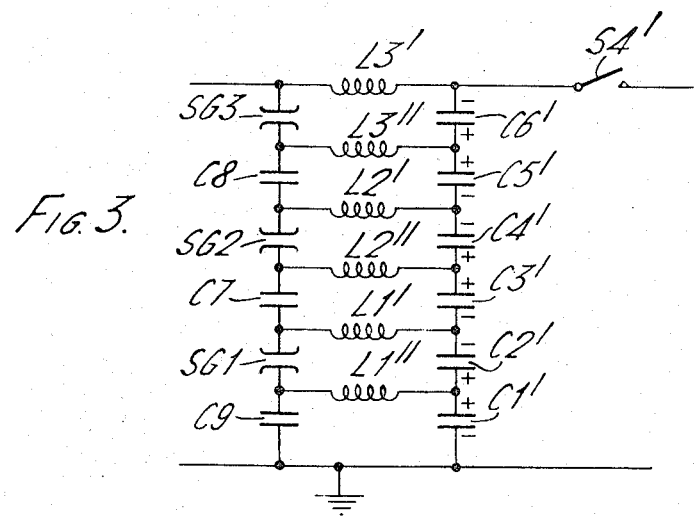
FIGURE 3 shows a modification of the circuit of FIGURE 1.

FIGURE 3 shows a modification of the circuit of FIGURE 1 arranged to provide substantially simultaneous closure of switches S1–S3. In FIGURE 3 these switches are shown as spark-gaps SG1–SG3, and the inductors L1–L3 are divided into series-connected pairs of inductors L1′, L1″; L2′, L2″; and L3′, L3″ respectively having each spark-gap connected between the two inductors of the respective pair. Capacitors C7, C8 and C9 are connected between SG1 and SG2, SG2 and SG3, and SG1 and ground as shown.

In operation SG1 is triggered from an external pulse source (not shown) and breaks down. The voltage V across C9 thus appears at the junction of SG1 and C7, which was previously at ground potential, and hence the potential at the junction of C7 and SG2, previously at potential V, rises to 2 v. This rise causes SG2 to become over-volted and break down, whereupon SG3 becomes similarly over-volted via C8, so that all three gaps break down in rapid succession.

Alternatively C9 and L1″ can be omitted, the lower side of SG1 being connected directly to the junction of C1′ and C2′, so that when SG1 is triggered the voltage V on C1′ appears at the junction of SG1 and C7 and causes SG2 to become over-volted. In the absence of L1″, the value of L1′ must be increased to give the same resonant frequency.

I claim:

1. A pulse generating circuit comprising a plurality of series-connected capacitors, connections for charging the capacitors in parallel so that consecutive capacitors of the series are charged with oppositely polarized voltages, and inductor means connected in series with switch means across only each alternate capacitor, whereby on said switch means being closed substantially simultaneously, the voltage on said alternate capacitors reverses to produce an output voltage pulse across the series-connected capacitors.

2. A circuit as claimed in claim 1 wherein said switch means are spark-gaps whereof one is triggerable from an external source and comprising connections between said gaps for successively over-volting the remaining gaps when said gap is triggered.

3. A circuit as claimed in claim 2 wherein each inductor means in series with said remaining gaps comprises a pair of series-connected inductors having a remaining gap connected between them, and wherein said over-volting connections are capacitors.

References Cited

UNITED STATES PATENTS

| 1,992,829 | 2/1935 | Marx | 321—15 X |
| 2,214,871 | 9/1940 | Westendorp | 321—15 |
| 3,121,835 | 2/1964 | Diebold | 321—15 |
| 3,260,865 | 7/1966 | Jelinek-Fink et al. | 320—1 |

BERNARD KONICK, *Primary Examiner.*

J. F. BREIMAYER, *Assistant Examiner.*